United States Patent
Hashimoto et al.

(10) Patent No.: US 6,332,338 B1
(45) Date of Patent: Dec. 25, 2001

(54) METHOD OF PRODUCING GLASS SUBSTRATE FOR INFORMATION RECORDING MEDIUM

(75) Inventors: Kazuaki Hashimoto; Xuelu Zou, both of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/269,409

(22) PCT Filed: Jul. 30, 1998

(86) PCT No.: PCT/JP98/03407

§ 371 Date: Apr. 20, 1999

§ 102(e) Date: Apr. 20, 1999

(87) PCT Pub. No.: WO99/06333

PCT Pub. Date: Feb. 11, 1999

Related U.S. Application Data

(60) Provisional application No. 60/066,675, filed on Nov. 14, 1997.

(30) Foreign Application Priority Data

Jul. 30, 1997 (JP) .................................................... 9-205025

(51) Int. Cl.$^7$ ........................................................ C03B 11/16
(52) U.S. Cl. ............................ 65/29.21; 65/30.14; 65/64; 65/66
(58) Field of Search ................................. 65/30.14, 60.4, 65/60.5, 63, 64, 66, 102, 30.1, 29.21; 501/59, 62, 64, 66, 70, 78, 73

(56) References Cited

U.S. PATENT DOCUMENTS

| | | | |
|---|---|---|---|
| 5,532,194 | * 7/1996 | Kawashima et al. ..................... | 501/9 |
| 5,561,089 | 10/1996 | Ishizaki et al. . | |
| 5,580,363 | 12/1996 | Goto et al. . | |
| 5,721,181 | * 2/1998 | Sehgal et al. ........................... | 501/65 |
| 5,726,108 | 3/1998 | Taguchi et al. . | |
| 5,741,745 | * 4/1998 | Sehgal et al. ........................... | 501/69 |
| 5,770,294 | 6/1998 | Sakamoto . | |
| 5,780,371 | * 7/1998 | Rifqi et al. .............................. | 501/67 |
| 5,900,296 | * 5/1999 | Hayashi et al. ....................... | 428/64.1 |
| 5,902,665 | * 5/1999 | Kuroda .................................. | 501/68 |
| 6,114,039 | * 9/2000 | Rifqi ..................................... | 428/410 |

FOREIGN PATENT DOCUMENTS

| | | |
|---|---|---|
| 7-157331 | 6/1920 | (JP) . |
| 1-239036 | 9/1989 | (JP) . |
| 7-133121 | 5/1995 | (JP) . |
| 7-300340 | 11/1995 | (JP) . |
| 8-335312 | 12/1996 | (JP) . |
| 9-100137 | 4/1997 | (JP) . |
| 90-118530 | 5/1997 | (JP) . |
| 9-183622 | 7/1997 | (JP) . |

* cited by examiner

Primary Examiner—Sean E. Vincent
(74) Attorney, Agent, or Firm—Nixon & Vanderhye

(57) ABSTRACT

Disclosed is a process for producing a glass substrate for an information recording medium by press-shaping a molten glass which gives a glass containing 0.1 to 30 mol % of $TiO_2$, 1 to 45 mol % of CaO, 5 to 40 mol % of total of MgO and the above CaO, 3 to 30 mol % of total of $Na_2O$ and $Li_2O$, 0 to 15 mol % of $Al_2O_3$ and 35 to 65 mol % of $SiO_2$ and having properties of a liquidus temperature of 1,360° C. or lower and a viscosity of at least 10 poise in a shaping-allowable temperature range, or by preparing a preform formed of a glass which contains 0.1 to 30 mol % of $TiO_2$, 1 to 45 mol % of CaO, 5 to 40 mol % of total of MgO and the above CaO, 3 to 30 mol % of total of $Na_2O$ and $Li_2O$, 0 to 15 mol % of $Al_2O_3$ and 35 to 65 mol % of $SiO_2$ and has properties of a liquidus temperature of 1,360° C. or lower and shaping the preform in the form of a disc by a re-heat pressing method. According to the above process, there can be mass-produced, with high productivity, high-quality glass substrates to be used for information recording media such as a magnetic disc, an optical disc, a magneto-optic disc, and the like.

28 Claims, No Drawings

METHOD OF PRODUCING GLASS SUBSTRATE FOR INFORMATION RECORDING MEDIUM

This application claims benefit of provisional application No. 60/066,675 filed Nov. 14, 1997.

TECHNICAL FIELD

The present invention relates to a process for the production of a glass substrate for an information recording medium and a process for the production of an information recording medium from the glass substrate obtained by the above process. More specifically, the present invention relates to an industrially advantageous process which enables the highly productive mass-production of high-quality glass substrates for use in information recording media such as a magnetic disc, an optical disc and a magneto-optical disc, and a process for the production of the above information recording medium by forming a recording layer on the glass substrate obtained by the above process.

TECHNICAL BACKGROUND

Main components of magnetic recording apparatus such as a computer include a magnetic recording medium and a magnetic head for reproducing magnetically recorded data. As a magnetic recording medium, a floppy disc and a hard disc are known. As a substrate material for a hard disc thereof, an aluminum alloy is used. With downsizing of a hard disc drive for a notebook computer and an increase in the density of magnetic recording, recently, the flying height of a magnetic head is clearly decreasing. A magnetic disc substrate has come to be required to have very high accuracy with regard to its surface smoothness. However, even if a highly accurate polishing material and a high-precision machine tool are used for polishing an aluminum alloy, the polished surface thereof undergoes plastic deformation since the aluminum alloy has a low hardness, and it is therefore difficult to produce a smooth surface having an accuracy higher than a certain degree. Further, with the ongoing downsizing and the thickness-decreasing a substrate for a hard disc drive, it is also strongly demanded to decrease the thickness of a substrate for a magnetic disc. Since, however, an aluminum alloy has low strength and low rigidity, it is difficult to decrease the thickness of the disc with maintaining a predetermined strength which is required on the basis of the specification of the hard disc drive. A glass substrate has come on the market as a substrate for a magnetic disc required to have high strength, high rigidity, high shock resistance and high surface smoothness.

The above glass substrate for an information recording medium can be easily produced as one having a high surface smoothness (having a smaller surface roughness Rmax, Ra value) as compared with any other substrate for an information recording medium and has strength sufficient for the thickness-decreasing and downsizing, and it is gradually expanding its market share. As the above glass substrate, there are well known a chemically strengthened glass substrate whose surface is strengthened by an ion-exchange method and a crystallized substrate which is crystallization-treated.

As an ion-exchange strengthened glass substrate, there is disclosed a glass substrate, for example, a glass substrate for a magnetic disc, which is obtained by strengthening a glass containing, by % by weight, 50 to 65% of a $SiO_2$, 0.5 to 14% of $Al_2O_3$, 10 to 32% of $R_2O$ (in which R is an alkali metal ion), 1 to 15% of Zno and 1.1 to 14% of $B_2O_3$ to form a compression stress layer on the glass substrate by an ion-exchange method (JP-A-1-239036).

Further, as a chemically strengthened glass substrate, there is a substrate formed of a glass containing 60.0 to 70.0% by weight of $SiO_2$, 0.5 to 14.0% by weight of $Al_2O_3$, 10.0 to 32.0% by weight of an alkali metal oxide, 1.0 15.0% by weight of ZnO and 1.1 to 14.0% by weight of $B_2O_3$ and having a linear expansion coefficient, a compression strength and a breaking strength, which are equivalent to, or greater than, specified values, respectively (JP-B-4-70262). As a crystallized glass, for example, there is disclosed a crystallized glass for a magnetic disc, which contains, by % by weight, 65 to 83% of $SiO_2$, 8 to 13% of $Li_2O$, 0 to 7% of $K_2O$ 0.5 to 5% of MgO, 0 to 5% of ZnO, 0 to 5% of PbO (in which MgO+ZnO+PbO: 0.5 to 5%), 1 to 4% of $P_2O_5$, 0 to 7% of $Al_2O_3$ and 0 to 2% of $As_2O_3+Sb_2O_3$ and which contains fine $Li_2O.2SiO_2$ crystal grains as a main crystal (U.S. Pat. No. 5,391,522).

Further, as a glass which constitutes a material for a chemically strengthened glass substrate, the following glass (a) or (b) is known.

(a) A glass comprising 55 to 62% by weight of $SiO_2$, 10 to 18% by weight of $Al_2O_3$, 2 to 10% by weight of $ZrO_2$, 2 to 5% by weight of MgO, 0.1 to 3% by weight of BaO, 12 to 15% by weight of $Na_2O$, 2 to 5% by weight of $K_2O$, 0 to 7% by weight of $P_2O_3$ and 0.5 to 5% by weight of $TiO_2$, the total amount of $Al_2O_3$ and $TiO_2$ being 13 to 20% by weight (see JP-A-1-167245).

(b) A glass comprising 64 to 70% by weight of $SiO_2$, 14 to 20% by weight of $Al_2O_3$, 4 to 6% by weight of $Li_2O$, 7 to 10% by weight of $Na_2O$, 0 to 4% by weight of MgO and 0 to 1.5% by weight of $ZrO_2$ (see JP-B-6-76224).

Meanwhile, with the recent downsizing and thickness-decreasing of a substrate for a hard disc drive and an increase in recording density, the flying height of a magnetic head rapidly decreases and the disc rotation rapidly increases, so that a material for a disc substrate is required to satisfy more severe strength, Young's modulus, surface smoothness, and the like. Particularly, with an increase in the recording density of a 3.5 inch hard disc for a server and with an increase in the substrate rotation speed which is required with an increase in the speed of data processing, the requirement of rigidity of a substrate material has been more severe, and the conventional aluminum substrate is reaching its limit. So long as demands of the higher capacity, the downsizing and the higher rotation speed of a hard disc are inevitable in the future, a substrate material for a magnetic recording medium will be strongly required to comply with a decrease in thickness, higher strength, a higher rigidity degree, higher smoothness and higher impact resistance.

However, chemically strengthened glass substrates as disclosed in the above JP-A-1-239036, etc., have a Young's modulus of approximately 80 GPa, and it may not be possible to satisfy severe demands required of a substrate for a hard disc drive in the future. There has been found the following defect; a conventional glass which is chemically strengthened by ion exchange contains a large amount of an alkali component, and when it is used in a high-temperature and high-humidity environment, alkali ion diffuses from a pinhole portion of the magnetic film, a portion where a magnetic film has a small thickness such as a vicinity of the magnetic film or a portion where glass is exposed, which triggers the corrosion or alteration of the magnetic film.

The conventional crystallized glass as disclosed in U.S. Pat. No. 5,391,522 has somewhat excellent Young's modulus and heat resistance over the above chemically strengthened glass. However, the problem is that it is inferior to glass in surface roughness and has its limit concerning a decrease in the flying height of a magnetic head, so that it cannot comply with an increase in the density of magnetic recording.

Further, when the rotation speed of a magnetic disc formed of a conventional glass substrate for an information recording medium is increased for speeding up the date processing, it is difficult to secure a stable flying height (distance between a magnetic head and a magnetic disc during the reproduction of recorded data).

A magnetic recording medium utilizing a glassy carbon as disclosed in JP-A-3-273525 is excellent over the above chemically strengthened glass and crystallized glass in heat resistance and light weight. However, it has may surface defects and it is presumably not sufficient for high-density recording. Further, since the glassy carbon has a very low Young's modulus and low strength, it is required to increase the thickness of the substrate, which results in a problem that it cannot comply with a decrease in the thickness of a substrate.

DISCLOSURE OF THE INVENTION

Under the circumstances, it is a first object of the present invention to provide an industrially advantageous process for the production of a glass substrate for an information recording medium with good reproducibility and stability, the glass substrate being excellent in Young's modulus, strength, surface flatness and surface smoothness, being free of the diffusion of an alkali under high-temperature and high-humidity environments and being capable of providing an information recording medium which can comply with an increase in recording density and higher-speed rotation.

It is a second object of the present invention to provide a process for the production of an information recording medium which can comply with an increase in recording density and higher-speed rotation, from the above glass substrate for an information recording medium which substrate is obtained by the above process and has the above performances.

The present inventors have made diligent studies for causes which make it difficult to secure a stable flying height when conventional glass substrates for an information recording medium are used to attain a higher rotation speed. As a result, it has been found that an information recording medium deforms due to a resonance, etc., during the high-speed rotation of the information recording medium so that it is difficult to secure a stable flying height. It has been also found that it is preferred to increase the Young's modulus of a substrate for an information recording medium to 90 GPa or more in order to prevent the deformation of the information recording medium caused by a resonance, etc., during the high-speed rotation of the information recording medium.

A crystallized glass substrate is among substrates for an information recording medium which have high Young's moduli. However, the strength and Young's modulus of the crystallized glass substrate are controlled by the degree of its crystallization. Therefore, when one intends to increase the strength and Young's modulus, the ratio of a crystal increases, which results in difficulties in obtaining a surface flatness (surface roughness Rmax, Ra) required of a substrate for an information recording medium. Further, crystal grains which fall apart constitute a factor which inhibits the surface smoothness. Even when the crystallized glass substrate is used for attaining the above higher-speed rotation, therefore, it is difficult to secure a stable flying height.

In the production of a glass substrate for an information recording medium, there is further another condition that chemical strengthenining is permitted and that the substrate is almost free of the problem that an alkali in the substrate is diffused from the substrate. Further, a press shaping method in which a production cost is relatively low is widely employed for shaping a glass into the form of a disc, and for preventing an adverse influence on a mold in the above method, it is preferred to maintain a liquidus temperature at 1,360° C. or lower.

For achieving the above objects, the present inventors further diligently studied on the basis of the above findings, and as a result, it has been found that the first object can be achieved by preparing glass materials to obtain a glass which characteristically has a specific composition, has a liquidus temperature of 1,360° C. or lower, has a viscosity of at least 10 poise in a shaping-allowable temperature range and has a transition point temperature of less than 700° C., and then direct-press-shaping a molten glass obtained by melting the above glass materials, or by bringing a direct-press-shaped glass substrate into a chemically strengthening molten salt in a post step, or by carrying out an alkali ion diffusion prevention treatment in a post step with regard to a glass substrate obtained by the direct press shaping or by the contacting to the molten salt.

Further, it has been found that the above first object can be also achieved by preparing a preform from the above molten glass and re-heat-press-shaping the preform, or by bringing a glass substrate obtained by the re-heat-press-shaping into contact with a chemically strengthening molten salt in a post step or by carrying out an alkali ion diffusion prevention treatment in a post step with regard to a glass substrate obtained by the direct press shaping or by the contacting to the molten salt.

The present invention has been completed on the basis of the above findings.

That is, the present invention provides (1) a process for the production of a glass substrate having the form of a disc for an information recording medium by press shaping with a mold having at least an upper mold member and a lower mold member, which comprises preparing glass materials to obtain a glass which contains 0.1 to 30 mol % of $TiO_2$, 1 to 45 mol % of CaO, 5 to 40 mol % of total of MgO and the above CaO, 3 to 30 mol % of total of $Na_2O$ and $Li_2O$, 0 to 15 mol % of $Al_2O_3$ and 35 to 65 mol % of $SiO_2$ and has properties of a liquidus temperature of 1,360° C. or lower and a viscosity of at least 10 poise in a shaping-allowable temperature range, melting said glass materials to obtain a molten glass, feeding the molten glass through a feed port into said mold and press-shaping the molten glass with the mold (the above process will be referred to as "Process I" hereinafter), (2) a process for the production of a glass substrate for an information recording medium, which comprises preparing a preform formed of a glass which contains 0.1 to 30 mol % of $TiO_2$, 1 to 45 mol % of CaO, 5 to 40 mol % of total of MgO and the above CaO, 3 to 30 mol % of total of $Na_2O$ and $Li_2O$, 0 to 15 mol % of $Al_2O_3$ and 35 to 65 mol % of $SiO_2$ and has properties of a liquidus temperature of 1,360° C. or lower and a viscosity of at least 10 poise in a shaping-allowable temperature range, and shaping the preform into the form of a disc by a re-heat pressing method (the above process will be referred to as "Process II" hereinafter), (3) a process for the production of a glass substrate for an information recording medium, which comprises bringing the glass substrate obtained by the above process (1) or (2) into contact with a chemically strengthening molten salt in a post step to the above process (1) or (2), (4) a process for the production of a glass substrate for an information recording medium, which comprises carrying out an alkali ion diffusion prevention treatment of the glass substrate obtained by the above process (1), (2) or (3) in a post step to the above process (1), (2) or (3), and (5) a process for the production of an information recording medium, which comprises forming at least an information recording layer on the glass substrate obtained by the above process (1), (2), (3) or (4).

BEST MODES FOR PRACTCING THE INVENTION

The above Process I, one of the processes for the production of a glass substrate for an information recording medium (to be sometimes simply referred to as "glass substrate" hereinafter), is a process in which a molten glass is direct-press-shaped with an upper mold member and a lower mold member of a mold, and as the above molten glass, there is used a glass which contains 0.1 to 30 mol % of $TiO_2$, 1 to 45 mol % of CaO, 5 to 40 mol % of total of MgO and the above CaO, 3 to 30 mol % of total of $Na_2O$ and $Li_2O$, 0 to 15 mol % of $Al_2O_3$ and 35 to 65 mol % of $SiO_2$ and has properties of a liquidus temperature of 1,360° C. or lower and a viscosity of at least 10 poise in a shaping-allowable temperature range. The mold has an upper mold member and a lower mold member, or it has an upper mold member, a lower mold member and a sleeve. The material for the mold is selected from cast iron, graphite, an Ni-containing alloy and a tungsten alloy. A release agent such as a boron nitride is applied to a shaping surface of the mold.

The "glass substrate for an information recording medium" as used in the present invention means a substrate formed of a glass (amorphous glass) which substantially does not contain crystal grains, and is essentially different from a substrate formed of a crystallized glass containing crystal grains or a substrate formed of a glass ceramic.

In the composition of a glass (this glass will be referred to as "glass for a substrate" hereinafter) to be obtained from the above molten glass, $TiO_2$ is a component suitable for obtaining a glass substrate having a high Young's modulus, and the content thereof is required to be at least 0.1 mol % for obtaining a glass substrate having a Young's modulus of at lest 90 GPa. When the content thereof exceeds 30 mol %, however, the devitrification resistance of the glass decreases, so that it is difficult to obtain a glass for a substrate having a liquidus temperature of 1,360° C. or lower.

CaO is a glass component suitable not only for obtaining a glass for a substrate having a low liquidus temperature but also for obtaining a glass substrate having a high Young's modulus, and the content thereof is required to be at least 1 mol % for obtaining a glass having a liquidus temperature of 1,350° C. or less and for obtaining a glass substrate having a Young's modulus of at least 90 GPa. When the content thereof exceeds 45 mol %, however, it is difficult to form a glass.

MgO is a glass component suitable for obtaining a glass substrate having a high Young's modulus and a low specific gravity. However, the above MgO has the action of increasing the liquidus temperature of a glass for a substrate. It is therefore required to incorporate MgO such that the total amount of MgO and CaO is 5 to 45 mol %. The content of MgO is preferably 0.5 to 40 mol %.

$Na_2O$ has the action of decreasing the Young's modulus of the glass substrate, while it is a glass component which decreases the liquidus temperature of a glass for a substrate to a great extent. The decrease in the liquidus temperature caused by the presence of $Na_2O$ comes to be more salient when above $Na_2O$ and $TiO_2$ are co-present. When a large amount of $TiO_2$ is incorporated, it is particularly preferred to incorporate such $Na_2O$. Further, $Na_2O$ is a glass component useful for obtaining a glass for a substrate having a large thermal expansion coefficient, and the thermal expansion coefficient of the glass can be adjusted by properly selecting the content thereof. $Li_2O$ is a glass component suitable for improving the solubility of the raw materials without decreasing the Young's modulus of the glass substrate, and it is also a glass component which serves to increase the strength by chemical strengthening. For these reasons, the total content of $Na_2O$ and $Li_2O$ is required to be at least 3 mol %. However, when the total content of the $Na_2O$ and $Li_2O$ exceeds 30 mol %, the chemical durability of the glass substrate decreases, and there is liable to be caused a problem that, when an information recording medium is obtained by forming a magnetic recording layer on the glass substrate, alkali ion is diffused from the glass substrate to the recording layer. Part of $Na_2O$ and $Li_2O$ may be replaced with $K_2O$, while, in this case, the effect of the chemical strengthening decreases.

Since $Al_2O_3$ is a glass component which does not serve to increase or decrease the Young's modulus of the glass substrate, it is not necessarily required to incorporate it. Since, however, it is a component effective for decreasing the liquidus temperature of a glass for a substrate, inhibiting phase-separating tendency, improving the viscosity in a processing temperature range and improving chemically strengthened characteristics, it may be incorporated as required. When $Al_2O_3$ is incorporated and when the content thereof exceeds 15 mol %, there are liable to be caused problems that the liquidus temperature sharply increases and that a non-dissolved substance is formed due to a deterioration in solubility.

$SiO_2$ is a component for forming a glass network, and the content thereof is required to be at least 35 mol % for obtaining a glass having a liquidus temperature of 1,360° C. or lower. However, when the content thereof exceeds 65 mol %, it is difficult to obtain a glass substrate having a Young's modulus of at least 90 GPa. $SiO_2$ is a component having an influence on the water resistance such as diffusion of alkali ion, and it is effective when the content thereof is 40 to 60 mol %.

Preferably, the above glass for a substrate contains, as glass component, 5 to 15 mol % of $TiO_2$, 4 to 20 mol % of CaO, 5 to 30 mol % of total of MgO and the above CaO, 5 to 22 mol % of $Na_2O$ and $Li_2O$, 0 to 8 mol % of $Al_2O_3$ and 40 to 60 mol % of $SiO_2$.

As already described, it is preferred to increase the Young's modulus of the glass substrate for preventing the deformation of the glass substrate caused by resonance, etc., when the glass substrate having a decreased thickness is rotated at a high rate. For example, it is preferred to adjust the Young's modulus of the glass substrate to at least 90 GPa for stably securing approximately 1 µm or less of the flying height of a data reproduction head from a magnetic disc when the magnetic disc formed of a glass substrate having a diameter of 3.5 inches and a thickness of 0.635 mm (25 mil; a general thickness of substrates for magnetic discs available at present) is rotated at 10,000 rpm (this case will be referred to as "Case A" hereinafter).

For obtaining a glass substrate by Process I, it is required to prevent the substantial precipitation of a crystal during its production process. That is because, if a glass is devitrified, glass material components are precipitated, and impurities remain in a formed glass and deteriorate the surface smoothness of the glass substrate surface. It is therefore preferred to carry out the steps of melting glass raw materials, shaping and cooling, at a temperature equivalent to, or higher than, a temperature around the liquidus temperature of the glass when a glass substrate is produced. Since, however, the above liquidus temperature is extremely high, a mold undergoes deformation (around 1,400° C.) when a direct press shaping is carried out, so that the production of the glass substrate is difficult itself and that it does not have practical utility any longer. It is therefore preferred to feed a molten glass to a mold through an outlet of a nozzle at a temperature which is within a temperature range corresponding to a glass viscosity of 10 to 500 poise and which is equivalent to, or higher than, a temperature around the liquidus temperature. Practically, a temperature which is −20° C. below the liquidus temperature may be sufficient so long as no crystallization takes place.

From the above viewpoints, the Young's modulus of the glass substrate to be obtained is determined to be at least 90 GPa, and the liquidus temperature of the glass for the substrate is determined to be 1,360° C. or lower. The above Young's modulus is preferably at least 100 GPa, and the above liquidus temperature is preferably 1,250° C. or lower, more preferably 1,150° C. or lower.

Even if a glass substrate obtained has a Young's modulus of 90 GPa or more, but when a value ("specific modulus" hereinafter) obtained by dividing the above Young's modulus by the specific gravity of the glass substrate is equivalent to, or less than, approximately $30 \times 10^6$ Nm/kg, the distortion of the magnetic disc in Case A is liable to exceed 2 $\mu$m at maximum, and it is difficult to secure a stable flying height of approximately 1 $\mu$m. Therefore, the specific gravity of the glass substrate obtained by Process I is preferably 3.5 g/cm$^3$ or less, more preferably 3.0 g/cm$^3$ or less. It is preferred that the above specific gravity should be low, while the specific gravity of a glass based on silicate is substantially 2.1 g/cm$^3$ or more.

Further, even if the liquidus temperature of the glass for a substrate is 1,360° C. or lower, but when the viscosity in a temperature range in which the glass for a substrate is shapeable (which temperature range means a temperature range at which the glass for a substrate is shapeable by direct press shaping, and used in this sense hereinafter), i.e., the viscosity in a temperature range including and higher than the liquidus temperature is extremely low, not only it is difficult to control the flow rate of a glass melt (molten glass) when the glass melt is supplied to a shaping step in the course of obtaining a glass substrate, but also the degree of freedom of a shapeable form decreases. The above viscosity of the molten glass used in Process I is at least 10 poise, preferably at least 30 poise. The upper limit thereof is 500 poise or less in view of stability in shape during the shaping.

Further, information is recorded in an information recording medium such as a magnetic disc, an optical disc, magneto-optical disc, or the like, or when information recorded in the above information recording medium is reproduced, the information recording medium is rotated in a state in which it is fixed to a drive motor spindle disposed in an information processing apparatus with a clamp. In this case, if there is a large difference between the thermal expansion coefficient of the information recording medium and the thermal expansion coefficient of the above clamp, the following problem arises.

That is, when the information recording medium is rotated, the heat generated in a drive motor, etc., sharply increases temperature of the information recording medium, the spindle, the clamp, etc., for example, up to about 90° C., and the above temperature increase causes the information recording medium to be loosened from the clamp or causes the information recording medium to be strained or distorted when there is a large difference between the thermal expansion coefficient of the information recording medium and the thermal expansion coefficient of the above clamp, which results in a change in the position of data-recorded portion (track) in the information recording medium, so that an error is liable to take place in recording and reproducing data.

The thermal expansion coefficient of the glass (glass for substrate) obtained from the molten glass in Process I is preferably as close to the thermal expansion coefficient of the above clamp as possible. Since the above clamp is generally formed of a stainless steel alloy, the thermal expansion coefficient (which means an average thermal expansion coefficient at 100 to 300° C., and is used in this sense hereinafter) of the glass for a substrate is preferably approximately 7 to 14 ppm/° C. ($7 \times 10^{-6}$ to $14 \times 10^{-6}$/° C.), more preferably 9 to 11 ppm/° C. ($9 \times 10^{-6}$ to $12 \times 10^{-6}$/° C.).

Further, the transition point temperature of the glass for a substrate in Process I is preferably less than 700° C., more preferably 550° C. or lower. That is, the temperature of the molten salt to be used for the chemical strengthening of a glass substrate obtained is generally adjusted to a temperature which is lower than the transition temperature by approximately 100 to 150° C., and when the temperature of the molten salt comes to be 500° C. or higher, the molten salt begins decomposition to cause damage on the glass substrate surface. When the transition point temperature is set within the above range, the above problem can be avoided.

The molten glass used in Process I is not much deformed to spread in lateral directions when fed into a mold, since it has a high surface tension even if its liquidus temperature is relatively high. When shaped by direct press shaping, the molten glass shows excellent reproduction based on the mold.

The glass for a substrate in Process I may have part or all of TiO$_2$ replaced with other transition metal oxide. The "other" transition metal oxide can be an oxide of at least one metal selected from V, Cr, Mn, Fe,Co, Ni, Ga, Ge, SM, Y, Zr, Nb, Mo, La, Ce, Pr, Nd, Pm, Eu, Gd, Tb, Dy, Ho, Er, Tm, Yb, Hf, Ta or W. Further, the glass for a substrate may have part or all of TiO$_2$ replaced with an oxide of at least one metal selected from Cu or Zn, although the Young's modulus is a little lower than that of the glass containing the above transition metal. Of these metal oxides, Y$_2$O$_3$ is particularly preferred since the Young's modulus of a glass obtained increases without increasing its specific gravity. The content of the above metal oxide is preferably 0 to 15 mol %, particularly preferably 0.1 to 8 mol %.

Since, however, the above transition metal oxide has almost no effect on an improvement in the Young's modulus of the glass but has a contrary effect and increases the specific gravity, the content thereof is properly selected depending upon kinds and contents of the other glass components so as to obtain a glass for an intended substrate.

When $ZrO_2$ is used as a transition metal oxide, the content of the $ZrO_2$ is preferably 7 mol % or less, more preferably 5 mol % or less. When ZrO2 is used as a transition metal oxide and when the content thereof is 5 mol % or less, the liquidus temperature can be decreased although it is only slightly.

When part of $TiO_2$ of the glass for a substrate in Process I is replaced with $Y_2O_3$ and $ZrO_2$, preferably, the glass preferably contains 0.1 to 30 mol % of $TiO_2$, 0.1 to 15 mol % of $Y_2O_3$ and 0.1 to 15 mol % of $ZrO_2$.

In Process I, a molten glass of the above glass for a substrate is fed into a mold through a feed port and direct-press-shaped with the mold, whereby a glass substrate is obtained. This glass substrate may be used as a glass substrate for an information recording medium without chemical strengthening, or it may be chemically strengthened and used as a glass substrate for an information recording medium. When the chemical strengthening treatment (according to a low-temperature ion-exchange method) is carried out, the glass before the chemical strengthening preferably contains, as glass components, at least 40 mol % of total of $SiO_2$ and $Al_2O_3$, 1 to 20 mol %, preferably 3 to 10 mol %, of $Li_2O$, 1 to 20 mol % of $Na_2O$, preferably 5 to 22 mol % of total of the $Li_2O$ and the $Na_2O$, and 5 to 30 mol % of total of MgO and CaO.

In the above case, it is preferred to incorporate at least 40 mol % of $SiO_2$ for forming a sufficient compression stress layer by the chemical strengthening, while part of the $SiO_2$ may be replaced with $Al_2O_3$. It is therefore preferred to incorporate at least 40 mol % of total of $SiO_2$ and $Al_2O_3$. The total amount of $SiO_2$ and $Al_2O_3$ is more preferably at least 44 mol %.

$Li_2O$ and $Na_2O$ are components for introducing into the glass $Li^+$ ion and $Na^+$ ion which are necessary for the chemical strengthening, and it is preferred to incorporate 3 to 10 mol % of $Li_2O$ and at least 5 mol % of total of $Na_2O$ and the $Li_2O$ for forming a sufficient compression stress layer. Further, the total content of $Na_2O$ and $Li_2O$ is preferably 22 mol % or less for inhibiting the diffusion of an alkali ion.

CaO and MgO are glass components effective for adjusting the Young's modulus and the liquidus temperature of the glass and the viscosity thereof in a shaping-allowable temperature, while they are also components which hinder an alkali ion from moving in the chemical strengthening. The total content of CaO and MgO is preferably 5 to 30 mol % for forming a sufficient compression stress layer.

The above chemical strengthening treatment is useful means for obtaining a glass substrate having a high impact resistance. For example, the chemical strengthening treatment by a low-temperature ion-exchange method can be carried out by immersing a glass substrate to be chemically strengthened, in a predetermined molten salt, i.e., a molten salt which is a nitrate or carbonate of potassium or sodium or a mixture of these and is maintained at a temperature lower than the transition point temperature $T_g$ of the glass by approximately 100 to 150° C.

The treatment for the prevention of the diffusion of an alkali ion is carried out by bringing a glass substrate into contact with a molten salt which is hydrogen sulfate, pyrosulfate or a mixture of these. In this case, the temperature of the above molten salt is generally in the range of from the melting point thereof to 400° C.

Process II of the present invention will be explained hereinafter.

Process II of the present invention comprises providing a preform formed of a glass having the same composition as that of the "glass for a substrate" referred to in the above Process I of the present invention and shaping the preform into a disc form by a re-heat pressing method, to obtain a glass substrate for an information recording medium.

The glass or molten glass for use as a material for the preform preferably has the composition which is the same as the composition preferred in the above Process I of the present invention.

The method of producing an intended preform is not specially limited, and it may be any one of hot processing and cold processing methods. Further, the form of the preform is not specially limited, either, and it may have any desired form of a sphere, a prism, a plate, and the like. After a preform is formed in a desired form by hot processing or cold processing, the preform may be polished.

A preform can be re-heat pressed by providing a mold having a cavity having the form of a desired disc (a mold formed of an upper mold member and a lower mold member or a mold formed of an upper mold member, a lower mold member and a sleeve), either pre-heating the preform so as to allow the preform to have a viscosity of approximately $10^7$ to $10^2$ poise and placing it in the above mold, or placing the preform in the above mold and heating it together with the mold so as to allow the preform to have a viscosity of $10^7$ to $10^2$ poise, and then press-shaping the preform under a shaping pressure of approximately 10 to 300 kgf/cm² for approximately 0.1 to 600 seconds. The shaping surface of the mold is generally provided with a release film, as is done in re-heat press shaping of a glass for other use.

A re-heat pressing method needs a higher cost than a direct pressing method. According to the re-heat pressing method, however, there can be obtained a glass substrate excellent in surface smoothness without carrying out the procedures of polishing or cutting after press-shaping. Even when the procedures of polishing or cutting is carried out after press-shaping to obtain a glass substrate having a desired surface smoothness, the polishing or cutting amount decreases as compared with a case where a glass substrate having the same surface smoothness is obtained by polishing or cutting a glass substrate obtained by the direct pressing method.

The glass substrate obtained by Process II may be used as a glass substrate for an information recording medium without carrying out the chemical strengthening, or it may be subjected to the treatment for chemical strengthening or the treatment for prevention of diffusion of an alkali ion and may be used as a glass substrate for an information recording medium. The above treatment for chemical strengthening and the treatment for prevention of diffusion of an alkali ion are carried out under the same conditions as those described in the explanation of Process I of the present invention. Therefore, the composition of the glass substrate preferred for carrying out these treatments is the same as the composition described in the explanation of Process I of the present invention.

The process for the production of an information recording medium, provided by the present invention, will be explained hereinafter.

The process for the production of an information recording medium, provided by the present invention, comprises forming at least a recording layer on the glass substrate for an information recording medium, obtained by Process I or Process II of the present invention, to produce an information recording medium which can comply with an increase in recording density and an increase in rotation speed.

The "recording layer formed on a glass substrate" as used in the information recording medium obtained by the process for the production of an information recording medium, provided by the present invention, refers to a recording layer having a structure of a single layer or a plurality of layers formed on the glass substrate surface directly or through a desired layer. Materials and a layer structure of the recording layer are properly selected depending upon an information recording medium as an end product, such that the recording layer functions as a magnetic recording layer, a magneto-optic recording layer, a write once recording layer or a phase change recording layer.

The above information recording medium is provided with a protective layer, a lubrication layer, etc., as required depending upon its kinds, similarly to conventional information recording media. Some kinds of information recording media have a structure in which a recording layer is sandwiched between two substrates. An information recording medium of the above structure may have the glass substrate obtained by the above Process of the present invention as at least one of the above two substrates.

In the above information recording medium, the substrate constituting the information recording medium is formed of the glass substrate obtained by the above Process I or Process II of the present invention, so that the information recording medium can easily comply with an increase in the rotation speed of information recording media. As a result, there can be easily obtained a data reproduction apparatus which permits fast access by using the above information recording medium to constitute a recording apparatus (e.g., a personal computer or an auxiliary recording apparatus used in a server and client system).

The present invention will be explained more specifically with reference to Examples hereinafter, while the present invention shall not be limited to these Examples.

Obtained glass substrates were determined for a thickness of each compression stress layer and physical properties of the glass substrates according to the following methods.

1. Thickness of compression stress layer Measured with a precision strain gauge (Babinet correction method) supplied by Toshiba Corp.

2. Physical properties (1) Young's modulus

A 20×20×100 mm sample was prepared, and 5 MHz ultrasonic waves propagating through the above sample were measured for a longitudinal wave velocity ($V_1$) and a transverse wave velocity ($V_s$) with a single-around acoustic velocity measuring apparatus (UVM-2, supplied by Chou-Onpa Kogyo-sha). Then, a Young's modulus was determined on the basis of the following expression.

Young's modulus$=(4G^2-3G \cdot V_1^2 \cdot \rho)/(G-V_1^2 \cdot \rho)$ $G=V_s^2 \cdot \rho$ $\rho$: Specific gravity of sample (g/cm$^3$)

(2) Specific modulus

Determined by dividing a Young's modulus of a sample by a specific gravity thereof.

(3) Liquidus temperature

A sample was placed in a container made of platinum and left in a gradient temperature furnace for 30 minutes, and the surface and inside of the sample were observed for a crystal through an optical microscope. A lowest temperature at which no crystal was precipitated was taken as a liquidus temperature.

(4) Viscosity

A rotational viscometer having a container formed of platinum and a rotor formed of platinum was used, and measurement was carried out from a viscosity in a melting temperature region to a viscosity around a liquidus temperature.

(5) Glass transition temperature ($T_g$)

A 5 mm$\phi$×20 mm sample was measured with a thermo-mechanical analyzer (TMA8140) supplied by Rigakusha at a temperature elevation rate of +4° C./minute. As a standard sample, $SiO_2$ was used.

(6) Thermal expansion coefficient

Thermal expansion coefficient means an average thermal expansion coefficient between 100 and 300° C., and measured together during the measurement of a glass transition temperature.

(7) Surface roughness Ra (Rmax)

Measured with AFM NanoScope 3A supplied by Digital Instruments.

EXAMPLES 1–45

Glass materials such as a silica powder, aluminum hydroxide, alumina, lithium carbonate, lithium sulfate, sodium carbonate, sodium nitrate, calcium carbonate, magnesium carbonate, magnesium oxide, titanium oxide, iron oxide, nickel oxide, yttrium oxide, lanthanum oxide, neodymium oxide, copper oxide, antimony oxide, arsenious acid, etc., were properly weighed so as to obtain a glass having a composition shown in Tables 1 to 8, and approximately 100 kg of a mixture was prepared in each Example.

Compositions shown in Tables to be described later show compositions of glasses per se, while the content of each component is nearly equivalent to a value as an oxide used as a raw material for the glass if figures after a decimal point is disregarded (this is also the case in other Examples).

Then, with an ambient-atmosphere-heating intermittently-melting apparatus which was formed of platinum and equipped with a melting furnace having an inner volume of 2 liters, a working vessel which was connected thereto, had an inner volume of 30 liters and had a stirrer and an outlet circular tube which was connected to the working vessel and had an inner diameter of 5 to 20 mm, a molten glass was prepared in the following manner. That is, the above mixture was placed in the melting vessel and melted at 1,350 to 1,450° C., and the molten mixture was stirred and clarified to obtain a molten glass.

The obtained molten glass was flowed out through the outlet circular tube at a temperature slightly (+2 to 5° C.) higher than the liquidus temperature. The outlet circular tube was temperature-controlled with a heat-generating means around the circular tube so as to have a predetermined temperature. The molten glass was received in a mold (lower mold member) which had the form of a circle (diameter 100 mm) and was formed of cast iron, and was immediately pressed with an upper mold member formed of cast iron. In this case, vicinities of side surfaces of a glass substrate were shaped with a sleeve provided on an top portion of the lower mold member. Then, the pressed glass was annealed to give a disc-shaped product having a diameter of approximately 100 mm and a thickness of 1 mm. During the pressing, the mold was heated to have a temperature of 400 to 500° C.

Then, the above disc-shaped product was cut and polished (with a cerium oxide polisher) to obtain a 3.5 inch$\phi$×0.635 mm disc-shaped glass substrate. The disc-shaped glass substrate had an Ra of 5 Å or less and an Rmax of 30 Å or less.

The molten glass which was fed to the lower mold member had a high surface tension so that it did not spread much in lateral directions. Therefore, the molten glass uniformly spread in all directions and showed excellent reproduction faithful to the mold. No bubbles were found in marginal portions.

In each Example other than Examples 25 and 26, the disc-shaped glass was treated as follows for chemical strengthening, to obtain a glass substrate as an end product.

First, mixed salts was prepared so as to contain $NaNO_3$ and $KNO_3$ in a weight ratio of 6:4, and the mixed salts were heated up to a temperature lower than the glass transition temperature ($T_g$)of the glass substrate to be chemically strengthened by 100° C., to obtain a molten salt. Then, the glass substrate to be chemically strengthened was immersed in the above molten salt for 9 hours to carry out the chemical strengthening. Besides the above salts, mixed salts of potassium nitrate, sodium nitrate and calcium carbonate may be used. Further, the heating temperature is preferably 600 to 350° C., particularly preferably 350 to 500° C.

Tables 1 to 8 show the thickness of compression stress layer of each of the glass substrates obtained in Examples (excluding glass substrates obtained in Examples 25 and 26) and physical properties of each glass substrate. For Young's modulus, specific modulus, surface roughness (Ra) and specific gravity, the chemically strengthened glass substrates were measured (excluding the glass substrates obtained in Examples 25 and 26), and for liquidus temperature, viscosity, glass transition temperature and thermal expansion coefficient, glass samples which were not chemically strengthened were measured. Further, the glass substrates were inspected for bubbles particularly in marginal portions, while no bubbles were observed. Further, an MR (magneto-resistive) head was used to carry out a grind height test (magnetic head floating 1 micro inch). As a result, no hitting of the head occurred. Further, no thermal asperity (heat-induced variation of resistance value of magnetic head) inherent to the MR head occurred.

TABLE 1

| | | Ex. 1 | Ex. 2 | Ex. 3 | Ex. 4 | Ex. 5 | Ex. 6 |
|---|---|---|---|---|---|---|---|
| Glass composition (mol %) | $SiO_2$ | 50 | 42 | 46 | 35 | 42 | 40 |
| | $Al_2O_3$ | 8 | 2 | — | 8 | 6 | 10 |
| | $Li_2O$ | 6 | 5 | 6 | 4 | 4 | 2 |
| | $Na_2O$ | — | 5 | 4 | 6 | 8 | 7 |
| | $Li_2O + Na_2O$ | 6 | 10 | 10 | 10 | 12 | 9 |
| | CaO | 15 | 13 | 20 | 18 | 8 | 12 |
| | MgO | 15 | 10 | 10 | 12 | 2 | 12 |
| | CaO + MgO | 30 | 23 | 30 | 30 | 10 | 24 |
| | $TiO_2$ | 6 | 23 | 14 | 15 | 30 | 15 |
| | Other component | | | | $Fe_2O_3$: 2 | | $Y_2O_3$: 2 |
| Thickness of compression stress layer (μm) | | 40 | 55 | 75 | 20 | 65 | 40 |
| Physical properties | Young's modulus (Gpa) | 104 | 113 | 110 | 104 | 104 | 103 |
| | Specific gravity (g/cm$^3$) | 2.75 | 3.10 | 2.90 | 2.96 | 2.95 | 2.91 |
| | Specific modulus (× 10$^6$ Nm/kg) | 37.8 | 36.5 | 37.9 | 35.2 | 35.3 | 35.4 |
| | Liquidus temp. (° C.) | 1120 | 1180 | 1150 | 1180 | 1210 | 1180 |
| | Viscosity at 1200° C. | 10 | 20 | 30 | 20 | 30 | 40 |
| | Viscosity at 1100° C. | 50 | — | — | — | — | — |
| | Viscosity at 1250° C. (poise) | — | — | — | — | — | — |
| | Thermal expansion coefficient (ppm/° C.) | 7.0 | 8.6 | 9.1 | 9.3 | 8.4 | 8.4 |
| | Glass transition temp. (Tg ° C.) | 620 | 615 | 575 | 610 | 650 | 645 |
| | Surface roughness (Ra) (Å) | 3 | 3 | 4 | 4 | 3 | 4 |

TABLE 2

| | | Ex. 7 | Ex. 8 | Ex. 9 | Ex. 10 | Ex. 11 | Ex. 12 |
|---|---|---|---|---|---|---|---|
| Glass composition (mol %) | $SiO_2$ | 40 | 48 | 60 | 42 | 50 | 40 |
| | $Al_2O_3$ | 2 | — | — | — | 3 | 4 |
| | $Li_2O$ | 6 | 18 | 6 | 12 | 10 | 2 |
| | $Na_2O$ | 2 | — | 3 | 18 | 5 | 3 |
| | $Li_2O + Na_2O$ | 8 | 18 | 9 | 30 | 15 | 5 |
| | CaO | 15 | 20 | 9 | 1 | 8 | 45 |
| | MgO | 30 | — | 9 | 13 | 10 | — |
| | CaO + MgO | 45 | 20 | 18 | 14 | 18 | 45 |
| | $TiO_2$ | 5 | 7 | 11 | 14 | 12 | 6 |

TABLE 2-continued

|  |  | Ex. 7 | Ex. 8 | Ex. 9 | Ex. 10 | Ex. 11 | Ex. 12 |
|---|---|---|---|---|---|---|---|
|  | Other component |  | ZrO$_2$: 4<br>Nb$_2$O$_5$: 2<br>La$_2$O$_3$: 1 | ZrO$_2$: 2 |  | NiO: 2 |  |
| Thickness of compression stress layer (μm) |  | 20 | 40 | 70 | 40 | 80 | 30 |
| Physical properties | Young's modulus (Gpa) | 115 | 110 | 102 | 102 | 104 | 109 |
|  | Specific gravity (g/cm$^3$) | 2.88 | 3.00 | 2.79 | 2.76 | 2.77 | 2.99 |
|  | Specific modulus (× 10$^6$ Nm/kg) | 40.0 | 36.7 | 36.6 | 37.0 | 37.6 | 36.5 |
|  | Liquidus temp. (° C.) | 1150 | 1000 | 1080 | 1190 | 1150 | 1090 |
|  | viscosity at 1200° C. | 20 | 5 | 40 | 20 | 10 | 20 |
|  | Viscosity at 1100° C. | — | 15 | 80 | — | — | — |
|  | Viscosity at 1250° C. (poise) | — | — | — | — | — | — |
|  | Thermal expansion coefficient (ppm/° C.) | 9.0 | 9.5 | 7.3 | 13.7 | 9.2 | 9.6 |
|  | Glass transition temp. (Tg ° C.) | 570 | 535 | 605 | 420 | 537 | 595 |
|  | Surface roughness (Ra) (Å) | 4 | 3 | 3 | 4 | 3 | 3 |

TABLE 3

|  |  | Ex. 13 | Ex. 14 | Ex. 15 | Ex. 16 | Ex. 17 | Ex. 18 |
|---|---|---|---|---|---|---|---|
| Glass composition (mol %) | SiO$_2$ | 54 | 44 | 45 | 42 | 46 | 44 |
|  | Al$_2$O$_3$ | — | 2 | 2 | — | — | — |
|  | Li$_2$O | 12 | 9 | 10 | 4 | 4 | 4 |
|  | Na$_2$O | 8 | 4 | 3 | 5 | 6 | 5 |
|  | Li$_2$O + Na$_2$O | 20 | 13 | 13 | 9 | 10 | 9 |
|  | CaO | 2 | 14 | 13 | 15 | 15 | 14 |
|  | MgO | 8 | 14 | 13 | 15 | 13 | 14 |
|  | CaO + MgO | 10 | 28 | 26 | 30 | 28 | 28 |
|  | TiO$_2$ | 16 | 13 | 14 | 15 | 12 | 15 |
|  | Other component |  |  |  | Nb$_2$O$_5$: 2<br>La$_2$O$_3$: 2 | Nd$_2$O$_3$: 2<br>ZrO$_2$: 2 | CuO: 2<br>ZrO$_2$: 2 |
| Thickness of compression stress layer (μm) |  | 40 | 65 | 40 | 25 | 40 | 30 |
| Physical properties | Young's modulus (Gpa) | 102 | 109 | 111 | 112 | 102 | 110 |
|  | Specific gravity (g/cm$^3$) | 2.73 | 2.87 | 2.86 | 3.22 | 2.73 | 3.00 |
|  | Specific modulus (× 10$^6$ Nm/kg) | 37.4 | 38.0 | 38.9 | 34.9 | 37.4 | 36.7 |
|  | Liquidus temp. (° C.) | 1200 | 1020 | 1080 | 1150 | 1200 | 1180 |
|  | Viscosity at 1200° C. | 20 | 10 | 30 | 20 | 15 | 30 |
|  | Viscosity at 1100° C. | — | 30 | — | — | — | — |
|  | Viscosity at 1250° C. (poise) | — | — | — | — | — | — |
|  | Thermal | 9.8 | 8.4 | 8.4 | 9.1 | 9.8 | 8.9 |

TABLE 3-continued

|  |  | Ex. 13 | Ex. 14 | Ex. 15 | Ex. 16 | Ex. 17 | Ex. 18 |
|---|---|---|---|---|---|---|---|
|  | expansion coefficient (ppm/° C.) |  |  |  |  |  |  |
|  | Glass transition temp. (Tg ° C.) | 505 | 650 | 645 | 600 | 505 | 605 |
|  | Surface roughness (Ra) (Å) | 3 | 4 | 3 | 4 | 4 | 3 |

TABLE 4

|  |  | Ex. 19 | Ex. 20 | Ex. 21 | Ex. 22 | Ex. 23 | Ex. 24 |
|---|---|---|---|---|---|---|---|
| Glass composition (mol %) | SiO$_2$ | 40 | 45 | 45 | 44 | 45 | 44 |
|  | Al$_2$O$_3$ | — | 2 | 2 | 2 | 1 | 2 |
|  | Li$_2$O | 4 | 10 | 10 | 10 | 12 | 13 |
|  | Na$_2$O | — | 3 | 2 | 4 | 5 | 5 |
|  | Li$_2$O + Na$_2$O | 4 | 13 | 12 | 14 | 17 | 18 |
|  | CaO | 36 | 11 | 10 | 14 | 13 | 13 |
|  | MgO | — | 15 | 15 | 15 | 13 | 12 |
|  | CaO + MgO | 36 | 26 | 25 | 29 | 26 | 25 |
|  | TiO$_2$ | 8 | 14 | 14 | 11 | 11 | 11 |
|  | Other component | La$_2$O$_3$: 1 ZrO$_2$: 5 Nb$_2$O$_5$: 6 |  |  | ZrO$_2$: 2 |  |  |
| Thickness of compression stress layer (μm) |  | 10 | 40 | 40 | 50 | 60 | 50 |
| Physical properties | Young's modulus (Gpa) | 115 | 110 | 111 | 109 | 108 | 107 |
|  | Specific gravity (g/cm$^3$) | 3.51 | 2.86 | 2.92 | 2.86 | 2.83 | 2.82 |
|  | Specific modulus (× 10$^6$ Nm/kg) | 32.8 | 38.5 | 38.1 | 38.1 | 38.1 | 37.8 |
|  | Liquidus temp. (° C.) | 1200 | 1100 | 1100 | 1070 | 1080 | 1050 |
|  | Viscosity at 1200° C. | 20 | 10 | 20 | 10 | 10 | <10 |
|  | Viscosity at 1100° C. | — | 30 | 40 | 20 | 20 | 10 |
|  | Viscosity at 1250° C. (poise) | — | — | — | — | — | — |
|  | Thermal expansion coefficient (ppm/° C.) | 8.9 | 9.3 | 9.4 | 10.1 | 10.7 | 11.0 |
|  | Glass transition temp. (Tg ° C.) | 670 | 560 | 565 | 540 | 530 | 520 |
|  | Surface roughness (Ra) (Å) | 4 | 3 | 3 | 4 | 3 | 4 |

TABLE 5

|  |  | Ex. 25 | Ex. 26 | Ex. 27 | Ex. 28 | Ex. 29 | Ex. 30 |
|---|---|---|---|---|---|---|---|
| Glass composition (mol %) | SiO$_2$ | 39 | 46 | 46 | 45 | 37 | 38 |
|  | Al$_2$O$_3$ | — | — | 2 | 4 | 2 | 2 |
|  | Li$_2$O | 5 | 8 | 10 | 7 | 4 | 9 |
|  | Na$_2$O | — | — | 3 | 4 | 2 | 2 |

TABLE 5-continued

|  |  | Ex. 25 | Ex. 26 | Ex. 27 | Ex. 28 | Ex. 29 | Ex. 30 |
|---|---|---|---|---|---|---|---|
|  | $Li_2O + Na_2O$ | 5 | 8 | 13 | 11 | 6 | 11 |
|  | CaO | 33 | 7 | 9 | 13 | 19 | 14 |
|  | MgO | — | — | 17 | 13 | 24 | 15 |
|  | CaO + MgO | 33 | 7 | 26 | 26 | 44 | 29 |
|  | $TiO_2$ | 10 | 7 | 13 | 14 | 14 | 16 |
|  | Other component | $La_2O_3$: 1  $ZrO_2$:6  $Nb_2O_5$: 6 | $La_2O_3$: 7  $ZrO_2$: 2  ZnO: 23 |  |  |  | $ZrO_2$: 4 |
| Thickness of compression stress layer (μm) |  | — | — | 50 | 70 | 15 | 20 |
| Physical properties | Young's modulus (Gpa) | 116 | 108 | 110 | 108 | 118 | 120 |
|  | Specific gravity (g/cm$^3$) | 3.53 | 3.93 | 2.88 | 2.86 | 3.05 | 3.05 |
|  | Specific modulus (× 10$^6$ Nm/kg) | 32.9 | 27.5 | 38.1 | 37.8 | 38.8 | 39.5 |
|  | Liquidus temp. (° C.) | 1220 | 1230 | 1100 | 1100 | 1230 | 1230 |
|  | Viscosity at 1200° C. | <10 | — | 20 | 30 | — | — |
|  | Viscosity at 1100° C. | — | — | — | 80 | — | — |
|  | Viscosity at 1250° C. (poise) | — | <10 | — | — | 10 | 20 |
|  | Thermal expansion coefficient (ppm/° C.) | 8.9 | 7.9 | 9.4 | 8.7 | 8.8 | 9.1 |
|  | Glass transition temp. (Tg ° C.) | 660 | 580 | 560 | 580 | 537 | 595 |
|  | Surface roughness (Ra) (Å) | 4 | 4 | 3 | 3 | 5 | 4 |

TABLE 6

|  |  | Ex. 31 | Ex. 32 | Ex. 33 | Ex. 34 | Ex.35 | Ex. 36 | Ex. 37 |
|---|---|---|---|---|---|---|---|---|
| Glass composition (mol %) | $SiO_2$ | 58 | 52 | 52 | 58 | 55 | 45 | 55 |
|  | $Al_2O_3$ | 6 | 6.5 | 6 | 3 | 7 | 10 | 9 |
|  | $Li_2O$ | 12 | 10 | 10 | 12 | 10 | 9 | 19 |
|  | $Na_2O$ |  |  |  | 4 |  |  |  |
|  | $Li_2O + Na_2O$ | 12 | 10 | 10 | 16 | 10 | 9 | 19 |
|  | CaO | 8 | 12 | 11 | 6 | 4 | 5 | 5 |
|  | MgO | 6 | 8 | 11 | 6 | 14 | 15 | 3 |
|  | CaO + MgO | 14 | 20 | 22 | 12 | 18 | 20 | 8 |
|  | $TiO_2$ | 8 | 7 | 7 | 8 | 5.5 | 15 | 3 |
|  | $Y_2O_3$ | 2 | 2.5 | 3 | 0.5 | 2 | 1 | 6 |
|  | $ZrO_2$ | — | 2 | — | 2.5 | 2.5 | — | — |
|  | Other component |  |  |  |  |  |  |  |
| Thickness of compression stress layer (μm) |  | 65 | 50 | 50 | 80 | 75 | 30 | 85 |
| Physical properties | Young's Modulus (Gpa) | 104 | 110 | 110 | 102 | 107 | 107 | 104 |
|  | Specific gravity (g/cm3) | 2.75 | 2.89 | 2.87 | 2.73 | 2.79 | 2.82 | 2.71 |
|  | Specific modulus (× 10$^6$ Nm/kg) | 38 | 38 | 38 | 37 | 38 | 38 | 38 |
|  | Liquidus temp. (° C.) | 1060 | 1220 | 1150 | 1100 | 1240 | 1110 | 1020 |

TABLE 6-continued

|  |  | Ex. 31 | Ex. 32 | Ex. 33 | Ex. 34 | Ex. 35 | Ex. 36 | Ex. 37 |
| --- | --- | --- | --- | --- | --- | --- | --- | --- |
|  | Viscosity at 1200° C. | 50 | — | 50 | 40 | — | 30 | 50 |
|  | Viscosity at 1100° C. | 100 | — | — | — | — | — | 110 |
|  | Viscosity at 1250° C. (poise) | — | <10 | — | — | 20 | — | — |
|  | Thermal expansion coefficient (ppm/° C.) | 77 | 78 | 79 | 80 | 69 | 70 | 86 |
|  | Glass transition temp. (Tg ° C.) | 565 | 610 | 569 | 554 | 615 | 620 | 465 |
|  | Surface roughness (Ra) (Å) | 5 | 3 | 4 | 3 | 3 | 4 | 5 |

TABLE 7

|  |  | Ex. 38 | Ex. 39 | Ex. 40 | Ex. 41 | Ex. 42 | Ex. 43 | Ex. 44 |
| --- | --- | --- | --- | --- | --- | --- | --- | --- |
| Glass composition (mol %) | $SiO_2$ | 45 | 40 | 65 | 60 | 45 | 58 | 45 |
|  | $Al_2O_3$ | 4 | 3 | 5 | 2 | 2 | 4 | 2 |
|  | $Li_2O$ | 20 | 7 | 4 | 16 | 10 | 5 | 12 |
|  | $Na_2O$ | 8 |  |  | 5 | 7 | 1 | 3 |
|  | $Li_2O + Na_2O$ | 28 | 7 | 4 | 21 | 17 | 6 | 15 |
|  | CaO | 1 | 18 | 7 | 4 | 15 | 3 | 12 |
|  | MgO | 4 | 22 | 7 | 4 | 10 | 16 | 12 |
|  | CaO + MgO | 5 | 40 | 14 | 8 | 25 | 19 | 24 |
|  | $TiO_2$ | 12 | 4 | 1 | 5 | 10 | 8 | 12 |
|  | $Y_2O_3$ | 1 | 5 | 6 | 3 | 1 | 0.8 |  |
|  | $ZrO_2$ | 5 | 1 | 5 | 1 | — | 4.2 | 2 |
|  | Other component |  |  |  |  |  |  |  |
| Thickness of compression stress layer (μm) |  | 90 | 40 | 20 | 80 | 40 | 35 | 70 |
| Physical properties | Young's modulus (Gpa) | 106 | 115 | 101 | 100 | 108 | 103 | 112 |
|  | Specific gravity (g/cm$^3$) | 2.83 | 3.12 | 2.88 | 2.67 | 2.83 | 2.79 | 2.85 |
|  | Specific modulus (× 10$^6$ Nm/kg) | 37 | 37 | 35 | 37 | 38 | 37 | 39 |
|  | Liquidus temp. (° C.) | 990 | 1210 | 1110 | 990 | 1120 | 1090 | 1130 |
|  | Viscosity at 1200° C. | 10 | 20 | 100 | 30 | 20 | 40 | 20 |
|  | Viscosity at 1100° C. | 30 | 40 | — | 70 | — | 80 | — |
|  | Viscosity at 1250° C. (poise) | — | — | — | — | — | — | — |
|  | Thermal expansion coefficient (ppm/° C.) | 115 | 89 | 72 | 96 | 96 | 78 | 93 |
|  | Glass transition temp. (Tg ° C.) | 400 | 570 | 620 | 455 | 565 | 610 | 565 |
|  | Surface roughness (Ra) (Å) | 4 | 6 | 5 | 5 | 3 | 3 | 4 |

TABLE 8

|  | Ex. 45 |
|---|---|
| Glass composition (mol %) | |
| $SiO_2$ | 45 |
| $Al_2O_3$ | 2 |
| $Li_2O$ | 11 |
| $Na_2O$ | 2 |
| $Li_2O + Na_2O$ | 13 |
| CaO | 10.5 |
| MgO | 10.5 |
| CaO + MgO | 21 |
| $TiO_2$ | 9 |
| $Y_2O_3$ | |
| $ZrO_2$ | 10 |
| Other component | |
| Thickness of compression stress layer (μm) | 45 |
| Physical properties | |
| Young's modulus (Gpa) | 119 |
| Specific gravity (g/cm$^3$) | 3.05 |
| Specific modulus (×10$^6$ Nm/kg) | 39 |
| Liquidus temp. (° C.) | 1210 |
| Viscosity at 1200° C. | |
| Viscosity at 1100° C. | |
| Viscosity at 1250° C. (poise) | 10 |
| Thermal expansion coefficient (ppm/° C.) | 92 |
| Glass transition temperature (Tg ° C.) | 525 |
| Surface roughness (Ra) (Å) | 4 |

Comparative Example 1

Raw materials for a glass were weighed so as to obtain a glass having substantially the same composition (in terms of mol %) as that of a glass described in Example 1 of JP-A-1-167245, and a glass substrate (not chemically strengthened) was obtained in the same manner as in Examples 1 to 45. The glass substrate was chemically strengthened under the same conditions as those in Examples 1 to 45, to obtain a glass substrate as an end product.

The above glass substrate was measured for a compression stress layer thickness, a Young's modulus, a specific gravity, a specific modulus and a glass transition temperature in the same manner as in Examples 1 to 45, and Table 9 shows values thereof.

Comparative Example 2

Raw materials for a glass were weighed so as to obtain a glass having substantially the same composition (in terms of mol %) as that of a glass described in Example 1 of JP-B-6-76224, and a glass substrate (not chemically strengthened) was obtained in the same manner as in Examples 1 to 45. The glass substrate was chemically strengthened under the same conditions as those in Examples 1 to 45, to obtain a glass substrate as an end product.

The above glass substrate was measured for a compression stress layer thickness, a Young's modulus, a specific gravity, a specific modulus and a liquidus temperature in the same manner as in Examples 1 to 45, and Table 9 shows values thereof.

Comparative Example 3

Raw materials for a glass were weighed so as to obtain a glass having substantially the same composition (in terms of mol %) as that of a glass (glass having composition 2) described in Example 1 of JP-B-4-70262, and a glass substrate (not chemically strengthened) was obtained in the same manner as in Examples 1 to 45. The glass substrate was chemically strengthened under the same conditions as those in Examples 1 to 45, to obtain a glass substrate as an end product.

The above glass substrate was measured for a compression stress layer thickness, a Young's modulus, a specific gravity, a specific modulus, a thermal expansion coefficient and a glass transition temperature in the same manner as in Examples 1 to 45, and Table 9 shows values thereof.

Comparative Example 4

Raw materials for a glass were weighed so as to obtain a glass having substantially the same composition (in terms of mol %) as that of a glass described in the claim of JP-A-7-187771, a molten glass was obtained therefrom, and it was heat-treated at a temperature described in the above claim for a period of time described in the above claim, to obtain a crystallized glass. The crystallized glass was processed in the same manner as in Examples 1 to 45, to obtain a glass substrate as an end product.

The above glass substrate was measured for a Young's modulus, a specific gravity, a specific modulus and a surface roughness in the same manner as in Examples 1 to 45, and Table 9 shows values thereof.

TABLE 9

|  | Comp. Ex. 1 | Comp. Ex. 2 | Comp. Ex. 3 | Comp. Ex. 4 |
|---|---|---|---|---|
| Glass composition (mol %) | | | | |
| $SiO_2$ | 64.2 | 68.5 | 67.2 | 52.0 |
| $Al_2O_3$ | 7.6 | 8.8 | 1.8 | 1.0 |
| $Li_2O$ | — | 10.0 | — | — |
| $Na_2O$ | 14.5 | 8.2 | 9.4 | 7.0 |
| $K_2O$ | 2.0 | — | 6.2 | 5.0 |
| CaO | — | — | 0.1 | 16.0 |
| MgO | 6.4 | 4.5 | 4.5 | — |
| BaO | 0.2 | — | — | — |
| $TiO_2$ | 4.0 | — | 0.5 | — |
| $ZrO_2$ | 1.0 | — | — | — |
| ZnO | — | — | 9.1 | — |
| $B_2O_3$ | — | — | 1.0 | — |
| $As_2O_3$ | — | — | 0.07 | — |
| $Sb_2O_3$ | — | — | 0.07 | — |
| F | — | — | — | 19.0 |
| Thickness of compression stress layer (μm) | 75 | 270 | 85 | — |
| Physical properties | | | | |
| Young's modulus (Gpa) | 74 | 78 | 76 | 93 |
| Specific gravity (g/cm$^3$) | 2.56 | 2.43 | 2.41 | 2.60 |
| Specific modulus (×10$^6$ Nm/kg) | 29.1 | 31.9 | 31.3 | 35.0 |
| Liquidus temp. (° C.) | — | 960 | — | — |
| Thermal expansion coefficient (ppm/° C.) | — | — | 9.6 | — |

TABLE 9-continued

|  | Comp. Ex. 1 | Comp. Ex. 2 | Comp. Ex. 3 | Comp. Ex. 4 |
|---|---|---|---|---|
| Glass transition temp. (Tg ° C.) | 626 | — | 555 | — |
| Surface roughness (Ra) (Å) | — | — | — | 25 |

As shown in Tables 1 to 8, the glass substrates obtained in Examples 1 to 45 had a high Young's modulus of 100 to 200 GPa and an excellent surface roughness (Rmax) of 3 to 6 Å. Further, the liquidus temperatures of material glasses of these glass substrates are relatively low, as low as 990 to 1,240° C. It is therefore considered that when these glass substrates are used, for example, to produce magnetic discs, there can be obtained magnetic discs which secure a stable flying height of approximately 1 μm or less during rotation at a high speed.

On the other hand, as shown in Table 9, the glass substrates obtained in Comparative Examples 1 to 4 have a low Young's modulus of 74 to 78 GPa. Further, the crystallized glass substrate obtained in Comparative Example 4 has a poor surface roughness (Ra) of 25 Å. It is therefore considered that when these glass substrates are used, for example, to produce magnetic discs, there can be only obtained magnetic discs having a difficulty in securing a stable flying height of approximately 1 μm or less during rotation at a high speed.

EXAMPLE 46

The chemically strengthened glass substrate (2.5 inch disc) obtained in Example 1 was immersed in a molten salt (300° C.) of potassium pyrosulfate for 5 minutes, to carry out treatment for the prevention of diffusion of alkali components (Li, Na and K) from the glass substrate. This glass substrate, which had been treated for the prevention of diffusion of alkali ions, was immersed in ultra-pure water at 80° C. for 24 hours and evaluated by ion chromatography to show that the amount of the alkali components (Li, Na and K) which diffused into the water was 0.1 to 0.3 μmol/sheet. The glass substrate, which had not been treated for the prevention of diffusion of alkali ions, showed 15 to 20 μmol/sheet.

For the above treatment for the prevention of diffusion of alkali components, the above molten salt of pyrosulfate may be replaced with a hydrogensulfate salt or a mixture of it with pyrosulfate. Further, the above molten salt may be replaced with hot concentrated sulfuric acid, hot glycerin, polyethylene glycol, hot water or water vapor.

EXAMPLES 47 TO 94

Tables 10 to 13 show glass compositions of Examples 47 to 94 in terms of mol %. As starting materials for melting each glass, $SiO_2$, $Al_2O_3$, $Al(OH)_3$, MgO, $Mg(OH)_2$, $CaCO_3$, $SrCO_3$, $Sr(NO_3)_2$, $BaCO_3$, $TiO_2$, $ZrO_2$, $Li_2CO_3$, $Na_2CO_3$, rare earth metal oxides such as $Y_2O_3$ and $La_2O_3$, etc., were weighed in an amount of 250 to 800 g so as to have a predetermined composition shown in Tables 10 to 13, and these starting materials were fully mixed to obtain a prepared batch. The batch was placed in a platinum crucible and melted at 1,400 to 1,500° C. in air for 3 to 6 hours. After the melting, the glass melt was cast into a carbon mold having a size of 180×15×25 mm or φ100 mm×5 mm, allowed to cool to a transition point temperature of the glass, then immediately placed in an annealing furnace, annealed in a transition temperature range of the glass for about 1 hour and allowed to cool to room temperature in the furnace. The resultant glass showed no precipitation of a crystal which was observable through a microscope.

The glass having a size of 180×15×25 mm was polished to 100×10×10 mm, 10×10×20 mm or 10×1×20 mm, and the resultant glasses were used as samples for measurements of a Young's modulus, a specific gravity and DSC. The disc-shaped glass having a size of φ100 mm×5 mm was polished to φ95 mm×0.8 mm in thickness, and the resultant glass was used as a sample for measurements of a surface roughness and strength. For the DSC measurement, the 10×20×2 mm plate-shaped glass was pulverized into a 150 mesh powder, 50 mg thereof was weighed and placed in a platinum pan, and a MAC-3300 model DSC apparatus was used. For the Young's modulus measurement, the 100×10×10 mm sample was used, and the ultrasonic method (already described) was employed. For a liquidus temperature of the glass, DSC was used for the measurement thereof. For confirming the liquidus temperature of the glass measured by DSC, the glass was placed in an electric furnace of which the temperature was set at the liquidus temperature obtained by DSC, maintained for 2 to 4 hours, cooled to room temperature while it was in a crucible, and the resultant glass was observed to confirm that it had no crystal observable through a microscope. Methods for measurements of the glass transition point and surface roughness were as already described. Tables 10 to 13 show data obtained by the measurements together with the compositions of the glasses.

Comparative Example 5

An ion-exchange glass substrate disclosed in JP-A-1-239036 was employed as Comparative Example 5, and Table 13 shows the composition and physical properties thereof.

TABLE 10

| | | Example | | | | | | | | | | | | |
|---|---|---|---|---|---|---|---|---|---|---|---|---|---|---|
| | | 47 | 48 | 49 | 50 | 51 | 52 | 53 | 54 | 55 | 56 | 57 | 58 | 59 | 60 |
| Glass composition (mol %) | $SiO_2$ | 55.0 | 55.0 | 55.0 | 55.0 | 54.0 | 55.0 | 55.0 | 53.0 | 53.0 | 52.0 | 52.0 | 52.0 | 52.0 | 52.0 |
| | $Al_2O_3$ | 7.0 | 7.0 | 7.0 | 9.0 | 5.0 | 6.0 | 7.0 | 6.0 | 6.0 | 5.0 | 5.0 | 5.0 | 7.0 | 6.5 |
| | MgO | 10.0 | 14.0 | 18.0 | 13.0 | 20.0 | 20.0 | 18.0 | 16.0 | 16.0 | 12.0 | 14.0 | 12.0 | 10.0 | 8.0 |
| | CaO | 8.0 | 4.0 | | | | | | 4.0 | | 8.0 | 8.0 | 8.0 | 8.0 | 12.0 |
| | SrO | | | | | | | | | | | | | | |
| | BaO | | | | | | | | | | | | | | |
| | ZnO | | | | | | | | | 4.0 | | | | | |
| | $Li_2O$ | 10.0 | 10 | 10.0 | 13.0 | 10.0 | 10.0 | 10.0 | 10.0 | 10.0 | 10.0 | 8.0 | 10.0 | 10.0 | 10.0 |
| | $Na_2O$ | | | | | | | | | | | | | | |
| | $Y_2O_3$ | 2.0 | 2.0 | 2.0 | 2.0 | 2.0 | 2.0 | 3.0 | 2.0 | 3.0 | 3.0 | 3.0 | 2.0 | 3.0 | 2.5 |
| | $TiO_2$ | 5.5 | 5.5 | 5.5 | 5.0 | 7.0 | 7.0 | 7.0 | 6.0 | 6.0 | 8.0 | 8.0 | 7.0 | 6.0 | 7.0 |
| | $ZrO_2$ | 2.5 | 2.5 | 2.5 | 3.0 | 2.0 | | | | 2.0 | 2.0 | 2.0 | 2.0 | 2.0 | 2.0 |
| | $CeO_2$ | | | | | | | | | | | | 2.0 | 2.0 | |

TABLE 10-continued

| | | Example | | | | | | | | | | | | |
|---|---|---|---|---|---|---|---|---|---|---|---|---|---|---|
| | | 47 | 48 | 49 | 50 | 51 | 52 | 53 | 54 | 55 | 56 | 57 | 58 | 59 | 60 |
| Physical properties | Liquidus temp. (° C.) | 1232 | 1242 | 1247 | 1210 | 1243 | 1238 | 1204 | 1228 | 1244 | 1237 | 1231 | 1211 | 1220 | 1217 |
| | Young's modulus (Gpa) | 106.5 | 106.7 | 106.3 | 104.0 | 108.7 | 105.6 | 106.1 | 111.0 | 109.7 | 112.1 | 112.6 | 111.2 | 110.9 | 109.7 |
| | Tg (° C.) | 608 | 615 | 626 | 581 | 616 | 612 | 618 | 615 | 609 | 609 | 626 | 601 | 612 | 608 |
| | Surface roughness Ra (Å) | 3 | 3 | 3 | 3 | 3 | 3 | 3 | 3 | 3 | 3 | 3 | 3 | 3 | 3 |

TABLE 11

| | | Example | | | | | | | | | | | | |
|---|---|---|---|---|---|---|---|---|---|---|---|---|---|---|
| | | 61 | 62 | 63 | 64 | 65 | 66 | 67 | 68 | 69 | 70 | 71 | 72 | 73 | 74 |
| Glass composition (mol %) | $SiO_2$ | 50.0 | 50.0 | 52.0 | 52.0 | 52.0 | 52.0 | 50.0 | 52.0 | 52.0 | 52.0 | 52.0 | 52.0 | 52.0 | 52.0 |
| | $Al_2O_3$ | 8.0 | 8.0 | 5.5 | 5.5 | 5.0 | 6.0 | 6.5 | 5.3 | 5.5 | 5.5 | 5.5 | 6.0 | 6.0 | 5.0 |
| | MgO | 8.0 | 8.0 | 7.0 | 10.5 | 10.0 | 11.0 | 10.0 | 7.0 | 7.0 | 4.0 | 7.0 | 7.5 | 7.0 | 5.0 |
| | CaO | 12.0 | 14.0 | 14.0 | 10.5 | 10.0 | 11.0 | 10.0 | 12.0 | 15.0 | 17.0 | 12.0 | 12.0 | 10.0 | 10.0 |
| | SrO | | | | | | | | 2.0 | | | | | | 8.0 |
| | BaO | | | | | | | 2.0 | | | | | | | |
| | ZnO | | | | | | | | | | | | | 5.0 | |
| | $Li_2O$ | 8.0 | 10.0 | 10.0 | 10.0 | 12.0 | 10.0 | 10.0 | 10.0 | 10.0 | 10.0 | 12.0 | 12.0 | 10.0 | 10.0 |
| | $Na_2O$ | 2.5 | | | | | | | | | | | | | |
| | $Y_2O_3$ | 2.5 | 2.0 | 2.5 | 2.5 | 2.5 | 3.0 | 2.5 | 2.7 | 3.5 | 2.5 | 2.5 | 3.5 | 3.0 | 3.0 |
| | $TiO_2$ | 7.0 | 6.0 | 7.0 | 7.0 | 6.5 | 7.0 | 7.0 | 7.0 | 7.0 | 7.0 | 7.0 | 7.0 | 7.0 | 7.0 |
| | $ZrO_2$ | 2.0 | 2.0 | 2.0 | 2.0 | 2.0 | | 2.0 | 2.0 | | 2.0 | 2.0 | | | |
| | $CeO_2$ | | | | | | | | | | | | | | |
| Physical properties | Liquidus temp. (° C.) | 1241 | 1211 | 1188 | 1212 | 1190 | 1153 | 1226 | 1187 | 1144 | 1158 | 1187 | 1172 | 1158 | 1094 |
| | Young's modulus (Gpa) | 108.3 | 109.8 | 110.2 | 111.0 | 111.1 | 110.0 | 110.3 | 110.1 | 110.3 | 109.4 | 109.9 | 109.7 | 108.8 | 107.7 |
| | Tg (° C.) | 600 | 607 | 607 | 606 | 590 | 598 | 606 | 605 | 603 | 608 | 592 | 588 | 587 | 593 |
| | Surface roughness Ra (Å) | 3 | 3 | 3 | 3 | 3 | 3 | 3 | 3 | 3 | 3 | 3 | 3 | 3 | 3 |

TABLE 12

| | | 75 | 76 | 77 | 78 | 79 | 80 | 81 | 82 | 83 | 84 | 85 | 86 | 87 |
|---|---|---|---|---|---|---|---|---|---|---|---|---|---|---|
| Glass composition (mol %) | $SiO_2$ | 52.0 | 58.0 | 52.0 | 52.0 | 52.0 | 60.0 | 52.0 | 52.0 | 52.0 | 52.0 | 52.0 | 52.0 | 52.0 |
| | $Al_2O_3$ | 5.5 | 6.0 | 5.0 | 5.0 | 5.0 | 4.0 | 5.0 | 5.5 | 5.5 | 5.5 | 5.5 | 5.0 | 5.0 |
| | MgO | | 6.0 | 10.0 | 8.5 | 8.5 | 4.5 | 7.0 | 4.0 | | 4.0 | 10.0 | 8.5 | 10.5 |
| | CaO | 21.0 | 8.0 | 10.0 | 9.0 | 9.0 | 4.5 | 7.5 | | | | 10.0 | 9.0 | 10.5 |
| | SrO | | | | | | | 6.0 | 17.0 | | | | | |
| | BaO | | | | | | | | | 17.0 | | | | |
| | ZnO | | | | | | | | | | 17.0 | | | |
| | $Li_2O$ | 10.0 | 12.0 | 12.5 | 12.5 | 15.0 | 12.0 | 12.5 | 10.0 | 10.0 | 10.0 | 7.5 | 7.5 | 10.0 |
| | $Na_2O$ | | 2.0 | | | | 8.0 | | | | | 5.0 | 7.5 | |
| | $Y_2O_3$ | 2.5 | | 3.0 | 3.0 | 3.0 | | 3.0 | 2.5 | 2.5 | 2.5 | 3.0 | 3.0 | |
| | $TiO_2$ | 7.5 | 8.0 | 7.5 | 10.0 | 7.5 | 7.0 | 7.0 | 7.0 | 7.0 | 7.0 | 7.0 | 7.0 | 7.0 |
| | $ZrO_2$ | 2.0 | | | | | | | 2.0 | 2.0 | 2.0 | | | |
| | $Er_2O_3$ | | | | | | | | | | | | | 5.0 |
| Physical properties | Liquidus temp. (° C.) | 1126 | 1056 | 1103 | 1174 | 1096 | 1143 | 1065 | 1084 | 1032 | 1075 | 1091 | 1043 | 1101 |
| | Young's modulus (Gpa) | 109.1 | 103.5 | 110.5 | 110.3 | 106.6 | 106.7 | 108.2 | 106.2 | 103.3 | 105.1 | 105.2 | 102.1 | 110.4 |
| | Tg (° C.) | 602 | 565 | 580 | 582 | 560 | 623 | 576 | 572 | 569 | 565 | 569 | 542 | 603 |
| | Surface roughness Ra (Å) | 3 | 3 | 3 | 3 | 3 | 3 | 3 | 3 | 3 | 3 | 3 | 3 | 3 |

TABLE 13

| | | Example | | | | | | | Comparative Example 5 |
|---|---|---|---|---|---|---|---|---|---|
| | | 88 | 89 | 90 | 91 | 92 | 93 | 94 | (weight %) |
| Glass composition (mol %) | SiO₂ | 52.0 | 52.0 | 52.0 | 52.0 | 52.0 | 52.0 | 52.0 | SiO₂: 73.0 |
| | Al₂O₃ | 5.0 | 5.0 | 5.0 | 5.0 | 5.0 | 5.0 | 5.0 | Al₂O₃: 0.6 |
| | MgO | 10.5 | 10.5 | 10.5 | 10.5 | 10.5 | 10.5 | 10.5 | CaO: 7.0 |
| | CaO | 10.5 | 10.5 | 10.5 | 10.5 | 10.5 | 10.5 | 10.5 | Na₂O: 9.0 |
| | Li₂O | 10.0 | 10.0 | 10.0 | 10.0 | 10.0 | 10.0 | 10.0 | K₂O: 9.0 |
| | Nd₂O₃ | 5.0 | | | | | | | ZnO: 2.0 |
| | Sm₂O₃ | | 5.0 | | | | | | As₂O₃: 0.2 |
| | Eu₂O₃ | | | 5.0 | | | | | |
| | Gd₂O₃ | | | | 5.0 | | | | |
| | Tb₂O₃ | | | | | 5.0 | | | |
| | Dy₂O₃ | | | | | | 5.0 | | |
| | Yb₂O₃ | | | | | | | 5.0 | |
| | TiO₂ | 7.0 | 7.0 | 7.0 | 7.0 | 7.0 | 7.0 | 7.0 | |
| Physical properties | Liquidus temp. (° C.) | 1124 | 1121 | 1132 | 1119 | 1234 | 1211 | 1195 | |
| | Young's modulus (Gpa) | 106.6 | 106.9 | 107.3 | 107.8 | 108.1 | 108.5 | 109.9 | 79.0 |
| | Tg (° C.) | 611 | 608 | 610 | 606 | 605 | 610 | 612 | 554 |
| | Surface roughness Ra (Å) | 3 | 3 | 3 | 3 | 3 | 3 | 3 | 12.0 |

As clearly shown in Tables 10 to 13, it is seen that the glass substrates in Examples 47 to 94 have a high Young's modulus so that these glass substrates, when used as a substrate for a magnetic recording medium, are almost free from the occurrence of distortion and slippage of the substrate even in the rotation of the substrate at a high speed and can comply with a further decrease in the thickness of the substrate. Further, these glasses can be polished to have a surface roughness (Ra) of 5 Å or less and are excellent in flatness, so that the flying height of a magnetic head can be decreased and that they are useful as a glass substrate for a magnetic recording medium.

In contrast, the chemically strengthened glass in Comparative Example 5 is excellent in surface smoothness and flatness, while it is considerably inferior to the glass substrate of the present invention in strength properties such as Young's modulus, and the like.

EXAMPLES 95–99

Those glasses having a size of 300×200×60 mm, obtained in Examples 62, 63, 66, 69 and 77, were polished to a size of 50×15×1 mm and disc-shaped glasses having a size of φ95 mm×0.8 mm in thickness to obtain glasses for chemical strengthening. These glasses were immersed in a treatment bath of a single KNO₃ salt, a treatment bath of mixed nitrates of 60% by weight of KNO₃ and 40% by weight of NaNO₃ or a treatment bath of 20% by weight of KNO₃ and 80% by weight of NaNO₃, or the like for 4 to 16 hours, to chemically strengthen them by ion-exchanging alkali ions of Li, Na, etc., or alkaline earth metal ions of Mg, Ca, etc., on each glass surface with Na and K ions in the above treating bath. In this manner, chemically strengthened glass substrates in Examples 95 to 99 were obtained. Table 14 shows the flexural strength of each of these chemically strengthened glasses. Data of Tg, Young's modulus and surface roughness were obtained from those glasses which were not yet treated for the chemical strengthening.

Comparative Example 6

A commercially available crystallized glass substrate, disclosed in Japanese Patent No. 2516553, was employed as Comparative Example 6, and Table 14 shows physical properties thereof.

TABLE 14

| | Example | | | | | Comp. Ex. 6 (Specification of Patent No. 2516553) |
|---|---|---|---|---|---|---|
| | 95 | 96 | 97 | 98 | 99 | |
| Chemically reinforceable glass | Ex. 62 | Ex. 63 | Ex. 66 | Ex. 69 | Ex. 77 | |
| SiO₂ | 50.0 | 52.0 | 52.0 | 52.0 | 52.0 | |
| Al₂O₃ | 8.0 | 5.5 | 6.0 | 5.5 | 5.0 | |
| MgO | 8.0 | 7.0 | 11.0 | 7.0 | 10.0 | |
| CaO | 14.0 | 14.0 | 11.0 | 15.0 | 10.0 | |
| Li₂O | 10.0 | 10.0 | 10.0 | 10.0 | 12.5 | |
| Y₂O₃ | 2.0 | 2.5 | 3.0 | 3.5 | 3.0 | |
| TiO₂ | 6.0 | 7.0 | 7.0 | 7.0 | 7.5 | |
| ZrO₂ | 2.0 | 2.0 | | | | |
| Tg (° C.) | 607 | 607 | 598 | 603 | 580 | — |

TABLE 14-continued

|  | Example | | | | | Comp. Ex. 6 (Specification of Patent No. 2516553) |
| --- | --- | --- | --- | --- | --- | --- |
|  | 95 | 96 | 97 | 98 | 99 |  |
| Young's modulus (Gpa) | 109.8 | 110.2 | 110.0 | 110.3 | 110.5 | 90–100 |
| Surface roughness Ra (Å) | 3 | 3 | 3 | 3 | 3 | 5–15 |
| Flexural strength (kg/mm$^2$) | 75 | 72 | 81 | 79 | 86 | 55–60 |
| Treating bath | 60% KNO$_3$ + 40% NaNO$_3$ | 60% KNO$_3$ + 40% NaNO$_3$ | KNO$_3$ | NaNO$_3$ | 60% KNO$_3$ + 40% NaNO$_2$ | — |
| Ion exchange temp. (° C.) | 500 | 500 | 490 | 500 | 480 |  |
| Treatment time (hrs.) | 4.0 | 4.0 | 4.0 | 4.0 | 4.0 |  |

As shown in Table 14, the chemically strengthened glass substrates in Examples 95 to 99 showed large values of glass strength properties such as Young's modulus, specific modulus and flexural strength. It is therefore seen that when these glass substrates are used as a substrate for magnetic recording medium, these glass substrates are almost free from the occurrence of distortion and slippage of the substrate even in the rotation of the substrate at a high speed and can comply with a further decrease in the thickness of the substrate. Further, these glasses can be polished to have an Ra of 3 Å or less and an Rmax of 20 Å or less and are excellent in surface smoothness, so that the flying height of a magnetic head can be decreased and that they are useful as a glass substrate for a magnetic recording medium.

In contrast, the chemically strengthened glass in Comparative Example 6 is inferior to the glass of the present invention in flexural strength and is considerably inferior to the glass substrate of the present invention in Young's modulus, so that it cannot comply with a decrease in the thickness of a substrate and an increase in the rotation speed. Particularly, a substrate having a high Young's modulus cannot satisfy an increase in recording density since the surface smoothness of the substrate is impaired by the presence of large crystal grains.

Those glasses for chemical strengthening, used in the above Examples 95 to 99, were shaped in the form of a 3.5 inch magnetic disc (φ95 mm, central hole diameter φ25 mm, thickness 0.8 mm), and then chemically strengthened according to the method described in the above Examples 95 to 99, to obtain magnetic discs formed of the chemically strengthened glasses. When each of these chemically strengthened glass substrates was set in a disc device and rotated at 50,000 rpm, no substrate was broken. Further, when discs obtained by forming a magnetic film on each of these substrates and rotated at 50,000 rpm, no disc was broken.

EXAMPLE 100

Molten glasses were prepared under the same conditions as those in Examples 9, 31, 34 and 37, the molten glasses were hot-shaped in the form of a sphere, and then the shaped spheres were cooled to obtain four kinds of spherical preforms having a diameter of 50 mm. The glass materials in Examples 9, 31, 34 and 37 are suitable for re-heat pressing since the amounts of SiO$_2$, TiO$_2$ and alkali ion can effectively prevent devitrification during the shaping.

Further, there was provided a mold which had an upper mold member, a lower mold member and a sleeve and was to form a disc-shaped cavity having a diameter of about 100 mm and a thickness of 1 mm when the above three members were assembled. The transfer shaping surface of each of the above upper mold member, lower mold member and sleeve was provided with a release film formed of.

Each of the above preforms was re-heat-press-shaped with the above mold to obtain disc-shaped products. In the above press shaping, each preform was heated together with the mold such that the glass (preform) had a viscosity of approximately 10$^6$ to 10$^3$ poise, the shaping pressure was set in the range of from 10 to 500 kgf/cm$^2$ depending upon compositions of the preforms, and the pressing was carried out for a time period selected from the range of from 0.1 to 600 seconds.

The above-obtained disc-shaped products had a diameter of about 100 mm and a thickness of 1 mm and had a surface roughness Ra of 100 Å or less.

Then, each disc-shaped product was post-treated in the same manner as in Example (one of Examples 9, 31, 34 and 37) of which the conditions had been the same as the conditions for preparing the molten glass therefor, to give glass substrates for an information recording medium as end products.

The above-obtained glass substrates for an information recording medium had the same physical properties as those of the glass substrates for an information recording medium obtained in Examples of which the conditions had been the same as the conditions for preparing the molten glasses therefor.

EXAMPLES 101–106

The glass substrates obtained in Examples 25 to 30 were used to produce magnetic disc in the following procedures.

For preventing the sticking of a magnetic head and a magnetic disc to each other, a texture was formed in a landing zone of each glass substrate with laser beam.

Then, a Cr undercoat layer, a CoPtCrTa magnetic layer and a carbon protective layer were consecutively laminated on each glass substrate surface on the texture-formed side, to obtain magnetic discs.

Each of the above-produced magnetic discs was fit in a hard disc drive, and recording and reproducing testes were carried out by rotating them at 12,000 rpm with a flying height being 1 μm or less, to show that all the magnetic discs accomplished normal recording and reproducing.

The present invention can be also applied to a load-unload magnetic disc on which no texture is formed.

Industrial Utility

According to the present invention, there can be stably and well-reproductively produced a glass substrate for an information recording medium, which substrate can easily give an information recording medium which is excellent in Young's modulus, strength, surface smoothness and surface uniformity, which is free from the diffusion of alkali even under high-temperature and high-humidity environments and which can comply with higher-density recording and higher-speed rotation.

Further, there can be produced an information recording medium which can comply with higher-density recording and higher-speed rotation, from a glass substrate for an information recording medium which substrate is obtained by the above production process and has the above performances.

What is claimed is:

1. A process for the production of a glass substrate having the form of a disc for an information recording medium by press shaping with a mold having at least an upper mold member and a lower mold member, which process comprises preparing glass materials to obtain a glass which contains 0.1 to 30 mol % of $TiO_2$, 1 to 45 mol % of CaO, 5 to 40 mol % of total of MgO and the above CaO, 3 to 30 mol % of total of $Na_2O$ and $Li_2O$, 0 to 15 mol % of $Al_2O_3$ and 35 to 65 mol % of $SiO_2$ and has properties of a liquidus temperature of 1,360° C. or lower and a viscosity of at least 10 poise in a shaping-allowable temperature range, melting said glass materials to obtain a molten glass while temperature-controlling the molten glass to prevent devitrification, then feeding the molten glass through a feed port into said mold and directly press-shaping the molten glass with the mold.

2. The process of claim 1, wherein the molten glass is temperature-controlled to have a temperature equivalent to, or higher than, a temperature around the liquidus temperature.

3. The process of claim 1, wherein the glass materials are prepared to obtain a glass which contains 5 to 15 mol % of $TiO_2$, 4 to 20 mol % of CaO, 5 to 30 mol % of total of MgO and the above CaO, 5 to 22 mol % of total of $Na_2O$ and $Li_2O$, 0 to 8 mol % of $Al_2O_3$ and 40 to 60 mol % of $SiO_2$.

4. The process of claim 1, wherein the glass materials are prepared to obtain the glass in which part of $TiO_2$ is replaced with other transition metal oxide.

5. The process of claim 4, wherein the transition metal oxide is an oxide of at least one metal selected from V, Cr, Mn, Fe, Co, Ni, Ga, Ge, Sm, Y, Zr, Nb, Mo, La, Ce, Pr, Nd, Pm, Eu, Gd, Tb, Dy, Ho, Er, Tm, Yb, Hf, Ta or W.

6. The process of claim 4, wherein the glass materials are prepared to obtain the glass in which part of $TiO_2$ is replaced with other transition metal oxide and a content of the transition metal oxide is 0.1 to 8 mol %.

7. The process of claim 6, wherein the transition metal oxide is $Y_2O_3$ and/or $ZrO_2$.

8. The process of claim 1, wherein the glass materials are prepared to obtain the glass containing 1 to 20 mol % of $Li_2O$.

9. The process of claim 1, wherein the glass materials are prepared to obtain the glass containing 1 to 20 mol % of $Na_2O$.

10. The process of claim 1, wherein the glass substrate has a Young's modulus of at least 90 GPa.

11. The process of claim 1, wherein the glass substrate formed of the glass having a transition point temperature of less than 700° C. is obtained.

12. A process for the production of a glass substrate for an information recording medium, which comprises preparing a preform formed of a glass which contains 0.1 to 30 mol % of $TiO_2$, 1 to 45 mol % of CaO, 5 to 40 mol % of total of MgO and the above CaO, 3 to 30 mol % of total of $Na_2O$ and $Li_2O$, 0 to 15 mol % of $Al_2O_3$ and 35 to 65 mol % of $SiO_2$ and has properties of a liquidus temperature of 1,360° C. or lower and a viscosity of at least 10 poise in a shaping-allowable temperature range, and shaping the preform into the form of a disc by a re-heat pressing method.

13. The process of claim 12, wherein the preform formed of the glass which contains 5 to 15 mol % of $TiO_2$, 4 to 20 mol % of CaO, 5 to 30 mol % of total of MgO and the above CaO, 5 to 22 mol % of total of $Na_2O$ and $Li_2O$, 0 to 8 mol % of $Al_2O_3$ and 40 to 60 mol % of $SiO_2$ is prepared.

14. The process of claim 12, wherein the preform formed of the glass in which part of $TiO_2$ is replaced with other transition metal oxide is prepared.

15. The process of claim 14, wherein the transition metal oxide is an oxide of at least one metal selected from V, Cr, Mn, Fe, Co, Ni, Ga, Ge, Sm, Y, Zr, Nb, Mo, La, Ce, Pr, Nd, Pm, Eu, Gd, Tb, Dy, Ho, Er, Tm, Yb, Hf, Ta or W.

16. The process of claim 14, wherein the preform formed of the glass in which part of $TiO_2$ is replaced with other transition metal oxide and a content of the transition metal oxide is 0.1 to 8 mol % is prepared.

17. The process of claim 16, wherein the transition metal oxide is $Y_2O_3$ and/or $ZrO_2$.

18. The process of claim 12, wherein the preform formed of the glass containing 1 to 20 mol % of $Li_2O$ is prepared.

19. The process of claim 12, wherein the preform formed of the glass containing 1 to 20 mol % of $Na_2O$ is prepared.

20. The process of claim 12, wherein the glass substrate has a Young's modulus of at least 90 GPa.

21. The process of claim 12, wherein the glass substrate formed of the glass having a transition point temperature of less than 700° C. is obtained.

22. A process for the production of a glass substrate for an information recording medium, which comprises bringing the glass substrate obtained by the process recited in claim 1 into contact with a molten salt for chemical strengthening in a post step to the above process.

23. The process of claim 22, wherein the molten salt for chemical strengthening has a temperature of 500° C. or lower.

24. A process for the production of a glass substrate for an information recording medium, which comprises treating the glass substrate obtained by the process recited in claim 1 for prevention of diffusion of alkali ion in a post step to the above process.

25. The process of claim 24, wherein the treatment for prevention of diffusion of alkali ion is carried out by bringing the glass substrate into contact with a molten salt which is a hydrogensulfate, pyrosulfate or a mixture of both.

26. A process for the production of an information recording medium, which comprises forming at least a recording layer on the glass substrate obtained by the process recited in claim 1.

27. A process for the production of a glass substrate having the form of a disc for an information recording medium by press shaping with a mold having at least an upper mold member and a lower mold member, which process comprises preparing glass materials to obtain a glass which contains 0.1 to 30 mol % of an oxide of at least one metal selected from V, Cr, Mn, Fe, Co, Ni, Ga, Ge, Sm, Y, Zr, Nb, Mo, La, Ce, Pr, Nd, Pm, Eu, Gd, Tb, Dy, Ho, Er, Tm, By, Hf, Ta or W, 1 to 45 mol % of CaO, 5 to 40 mol % of total of MgO and the above CaO, 3 to 30 mol % of total of $Na_2O$ and $Li_2O$, 0 to 15 mol % of $Al_2O_3$ and 35 to 65 mol % of $SiO_2$ and has properties of a liquidus temperature of 1,360° C. or lower and a viscosity of at least 10 poise in a shaping-allowable temperature range, melting said glass materials to obtain a molten glass while temperature-controlling the molten glass to prevent devitrification, then, feeding the molten glass through a feed port into said mold and directly press-shaping the molten glass with the mold.

28. A process for the production of a glass substrate for an information recording medium, which comprises preparing a preform formed of a glass which contains 0.1 to 30 mol % of an oxide of at least one metal selected from V, Cr, Mn, Fe, Co, Ni, Ga, Ge, Sm, Y, Zr, Nb, Mo, La, Ce, Pr, Nd, Pm, Eu, Gd, Tb, Dy, Ho, Er, Tm, Yb, Hf, Ta or W, 1 to 45 mol % of CaO, 5 to 40 mol % of total of MgO and the above CaO, 3 to 30 mol % of total of $Na_2O$ and $Li_2O$, 0 to 15 mol % of $Al_2O_3$ and 35 to 65 mol % of $SiO_2$ and has properties of a liquidus temperature of 1,360° C. or lower and a viscosity of at least 10 poise in a shaping-allowable temperature range, and shaping the preform into the form of a disc by a re-heat pressing method.

* * * * *